United States Patent
Vos et al.

(10) Patent No.: US 7,458,784 B2
(45) Date of Patent: *Dec. 2, 2008

(54) SUITCASE STYLE AIR COMPRESSOR ASSEMBLY

(75) Inventors: Stephen J. Vos, Jackson, TN (US); Lance Hathcock, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/123,417

(22) Filed: May 6, 2005

(65) Prior Publication Data

US 2005/0191187 A1    Sep. 1, 2005

Related U.S. Application Data

(63) Continuation-in-part of application No. 10/444,708, filed on May 23, 2003, now Pat. No. 7,163,382, and a continuation-in-part of application No. 10/410,129, filed on Apr. 9, 2003, now Pat. No. 6,923,627, which is a continuation-in-part of application No. 10/277,187, filed on Oct. 21, 2002, now Pat. No. 6,742,995, which is a continuation-in-part of application No. 09/802,149, filed on Mar. 8, 2001, now Pat. No. 6,655,925, and a continuation-in-part of application No. 09/801,406, filed on Mar. 8, 2001, now Pat. No. 6,532,990, and a continuation-in-part of application No. 09/801,408, filed on Mar. 8, 2001, now Pat. No. 6,532,991, and a continuation-in-part of application No. 09/802,139, filed on Mar. 8, 2001, now Pat. No. 6,468,048.

(60) Provisional application No. 60/575,907, filed on Jun. 1, 2004, provisional application No. 60/469,645, filed on May 12, 2003, provisional application No. 60/187,744, filed on Mar. 8, 2000, provisional application No. 60/187,680, filed on Mar. 8, 2000, provisional application No. 60/187,723, filed on Mar. 8, 2000, provisional application No. 60/187,745, filed on Mar. 8, 2000.

(51) Int. Cl.
*F04B 53/00* (2006.01)
*A01G 25/09* (2006.01)

(52) U.S. Cl. ............................... 417/234; 137/343

(58) Field of Classification Search ............ 417/234; 137/343, 899

See application file for complete search history.

(56) References Cited

U.S. PATENT DOCUMENTS 1,756,806 A    4/1930    Beach ................. 137/899.4

(Continued)

FOREIGN PATENT DOCUMENTS

EP    0 320 579    6/1989
JP    352022108 A    2/1977

OTHER PUBLICATIONS

"A Comprehensive Maintenance Training System for Industrial Pneumatics"; Explorer I Industrial Pneumatics; TII Technical Education Systems, Streamwood, IL 60107; http://www.tii-tech.com/expl.html; Mar. 20, 2002; 5 pages.

(Continued)

*Primary Examiner*—Charles G Freay
(74) *Attorney, Agent, or Firm*—Michael P. Leary; Adan Ayala

(57) ABSTRACT

The present invention is directed to a suitcase style air compressor assembly having an extensible handle bar assembly and a wheel assembly. When the extensible handle bar assembly is fully extended, the suitcase style air compressor assembly may be transported by utilizing the extensible handle bar assembly and the wheel assembly. When the suitcase style air compressor assembly reaches a worksite, the extensible handle bar assembly may be retracted so that the suitcase style air compressor assembly does not occupy a large space.

8 Claims, 12 Drawing Sheets

U.S. PATENT DOCUMENTS

| | | | |
|---|---|---|---|
| 2,116,642 A | 5/1938 | Richter | 221/73.5 |
| 2,122,656 A | 7/1938 | Paget | 230/235 |
| 2,434,675 A | 1/1948 | Simpson | 417/28 |
| 2,804,259 A | 8/1957 | Ralston | 230/58 |
| 2,826,354 A | 3/1958 | Field | 230/33 |
| D197,860 S | 3/1964 | Winger | D52/2 |
| 3,538,950 A | 11/1970 | Porteners | 137/608 |
| 3,633,618 A | 1/1972 | Blackmore et al. | 137/597 |
| 3,698,420 A | 10/1972 | Grundy et al. | 137/329.06 |
| 3,760,842 A | 9/1973 | Mikiya | 137/557 |
| 4,027,993 A | 6/1977 | Wolff | 415/1 |
| 4,407,521 A * | 10/1983 | Zeitlin | 280/655 |
| D273,493 S | 4/1984 | Vitaloni | D15/9 |
| 4,512,361 A | 4/1985 | Tisbo et al. | 137/355.27 |
| 4,621,984 A * | 11/1986 | Fussell | 417/234 |
| 4,622,857 A | 11/1986 | Nelson | 73/744 |
| 4,688,308 A | 8/1987 | Alvarez | 29/33 R |
| 4,768,930 A | 9/1988 | Grime et al. | 417/362 |
| 4,770,410 A | 9/1988 | Brown | 272/70.3 |
| 4,777,976 A | 10/1988 | Johnston et al. | 137/355.27 |
| 5,030,067 A * | 7/1991 | Ushiota et al. | 417/313 |
| 5,038,578 A | 8/1991 | Manz et al. | 62/292 |
| 5,038,819 A | 8/1991 | Sutphen | 137/343 |
| 5,054,740 A | 10/1991 | Wheeler | 248/675 |
| 5,303,733 A | 4/1994 | Nelson | 137/505.38 |
| 5,396,885 A | 3/1995 | Nelson | 128/204.18 |
| 5,429,306 A | 7/1995 | Schneider et al. | 239/154 |
| 5,518,032 A | 5/1996 | Berke | 137/899.4 |
| 5,598,869 A | 2/1997 | Nelson | 137/505.11 |
| 5,700,137 A | 12/1997 | Simonette | 417/364 |
| 5,884,659 A | 3/1999 | Prosser et al. | 137/587 |
| 6,004,103 A | 12/1999 | Fisher et al. | 417/26 |
| 6,009,595 A * | 1/2000 | Leasure et al. | 15/329 |
| 6,094,773 A * | 8/2000 | Krentz et al. | 15/321 |
| 6,098,769 A | 8/2000 | Yen | 190/108 |
| 6,129,516 A | 10/2000 | Wang | 417/36 |
| 6,202,684 B1 | 3/2001 | Angel et al. | 137/557 |
| D447,149 S | 8/2001 | Davis et al. | D15/9 |
| 6,447,257 B2 | 9/2002 | Orschell | 417/201 |
| 6,468,048 B1 | 10/2002 | Burkholder et al. | 417/234 |
| 6,503,063 B1 * | 1/2003 | Brunsell | 417/234 |
| 6,532,990 B1 | 3/2003 | Wood et al. | 137/899.4 |
| 6,582,201 B2 | 6/2003 | Lucchi | 417/234 |
| 6,655,925 B1 | 12/2003 | Robenalt et al. | 417/234 |
| 6,923,627 B1 * | 8/2005 | Wood et al. | 417/234 |
| 6,991,436 B2 * | 1/2006 | Beckman et al. | 417/201 |
| 2002/0131872 A1 * | 9/2002 | Lucchi | 417/234 |
| 2003/0180156 A1 | 9/2003 | Brashears et al. | 417/234 |
| 2005/0031458 A1 * | 2/2005 | Brashears | 417/234 |

OTHER PUBLICATIONS

"Fire & Rescue Portable Systems—Air Distribution for Breathing, Filling and Rescue Tools"; MACK™ (Multi-Air Command Kit) Series; MACK Air Distrubution Units; http://www.airsystems.cc/product_pages/fire_and_rescue/MACK_air_distribution_units.html; Mar. 20, 2002; 3 pages.

"Push to Connect Fittings"; Hose Reel, Air Hose, & Fitting Specialists; http://airhosereels.com/push-to-connect-fittings.html; Mar. 20, 2002; 2 pages.

"Emglo has taken excellence in workmanship and reliability one step further. With Master Series"; http://www.aircompressorworks.com/emglo.htm; Jun. 28, 2002; 1 page.

"NorthStar Regulator/Manifold Kit" Northern Tool & Equipment Co., 2001, NorthernTool.com, Mar. 20, 2002; 2 pages.

* cited by examiner

SUITCASE STYLE AIR COMPRESSOR ASSEMBLY

CROSS-REFERENCE TO RELATED DOCUMENTS

The present application claims the benefit under 35 U.S.C. § 119(e) of U.S. Provisional Application No. 60/575,907, filed Jun. 1, 2004.

The present application is a continuation-in-part of U.S. application Ser. No. 10/444,708, filed May 23, 2003, now U.S. Pat. No. 7,163,382 which claims the benefit under 35 U.S.C. § 119(e) of U.S. Provisional Application No. 60/469,645, filed May 12, 2003 and is a continuation-in-part of U.S. application Ser. No. 10/410,129, filed Apr. 9, 2003, now U.S. Pat. No. 6,923,627 which in turn is a continuation-in-part of U.S. application Ser. No. 10/277,187, filed Oct. 21, 2002, now U.S. Pat. No. 6,742,995, which in turn is (i) a continuation-in-part of U.S. application Ser. No. 09/802,149, filed Mar. 8, 2001, now Pat. No. 6,655,925, which claims the benefit under 35 U.S.C. § 119(e) of U.S. Provisional Application Ser. No. 60/187,744, filed Mar. 8, 2000; (ii) a continuation-in-part of U.S. application Ser. No. 09/801,406, filed Mar. 8, 2001, now U.S. Pat. No. 6,532,990, which claims the benefit under 35 U.S.C. § 119(e) of U.S. Provisional Application Ser. No. 60/187,680, filed Mar. 8, 2000; (iii) a continuation-in-part of U.S. application Ser. No. 09/801,408, filed Mar. 8, 2001, now U.S. Pat. No. 6,532,991, which claims the benefit under 35 U.S.C. § 119(e) of U.S. Provisional Application Ser. No. 60/187,723, filed Mar. 8, 2000; and (iv) a continuation-in-part of U.S. application Ser. No. 09/802,139, filed Mar. 8, 2001, now U.S. Pat. No. 6,468,048, which claims the benefit under 35 U.S.C. § 119(e) of U.S. Provisional Application Ser. No. 60/187,745, filed Mar. 8, 2000. All above-mentioned patent applications and patents are herein incorporated by reference in their entirety.

The present application incorporates the following applications by reference in their entirety:

| Attorney Docket No. | U.S. Application No. | Filing Date |
| --- | --- | --- |
| DEV 03-11-1 | 29/179,391 | Apr. 9, 2003 |
| DEV 03-10-2 | 10/812,235 | Mar. 29, 2004 |
| DEV 03-19-2 | 10/805,836 | Mar. 22, 2004 |
| DEV 00-1-3A | 10/832,627 | Apr. 26, 2004 |
| PTG 02-96-2 | 10/601,225 | Jun. 20, 2003 |
| PTG 02-96-3 | 10/601,226 | Jun. 20, 2003 |
| PTG 02-96-4 | 10/600,040 | Jun. 20, 2003 |

FIELD OF THE INVENTION

The present invention relates generally to the field of air compressors, and more particularly to a suitcase style air compressor assembly.

BACKGROUND OF THE INVENTION

Air compressor assemblies are used to provide compressed air for operating air powered tools such as nailing tools, socket driving tools, material shaping tools, sanding tools, spray painting tools, inflation chucks, and the like.

Air compressor assemblies in portable applications are conventionally designed like a wheelbarrow, having a handle bar assembly and a wheel assembly. An operator often transports the conventional portable air compressor assembly by pushing or pulling the handle bar assembly so that the air compressor assembly may move forward on the wheel assembly. However, since the handle bar assembly is typically long, a conventional portable air compressor assembly is bulky and occupies a large space. This may lead to operational difficulties. For example, there may need an air compressor assembly at a worksite. Thus, a conventional portable air compressor assembly is transported to the worksite on the wheel assembly. However, it is later found out that the worksite does not have a space large enough to hold the air compressor assembly because the handle bar assembly is too long. Thus, an operator is not able to operate the air compressor assembly at the worksite. This often leads to the operator's great frustration.

Thus, it would be advantageous to provide an air compressor assembly that is easily transportable with a handle bar assembly and a wheel assembly yet compact enough that the air compressor assembly does not occupy a large space.

SUMMARY OF THE INVENTION

Accordingly, the present invention is directed to a suitcase style air compressor assembly having an extensible handle bar assembly and a wheel assembly. When the extensible handle bar assembly is extended, the suitcase style air compressor assembly may be transported easily by utilizing the extensible handle bar assembly and the wheel assembly. When the suitcase style air compressor assembly reaches a worksite, the extensible handle bar assembly may be retracted so that the suitcase style air compressor assembly is more compact and does not require a large space to operate.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
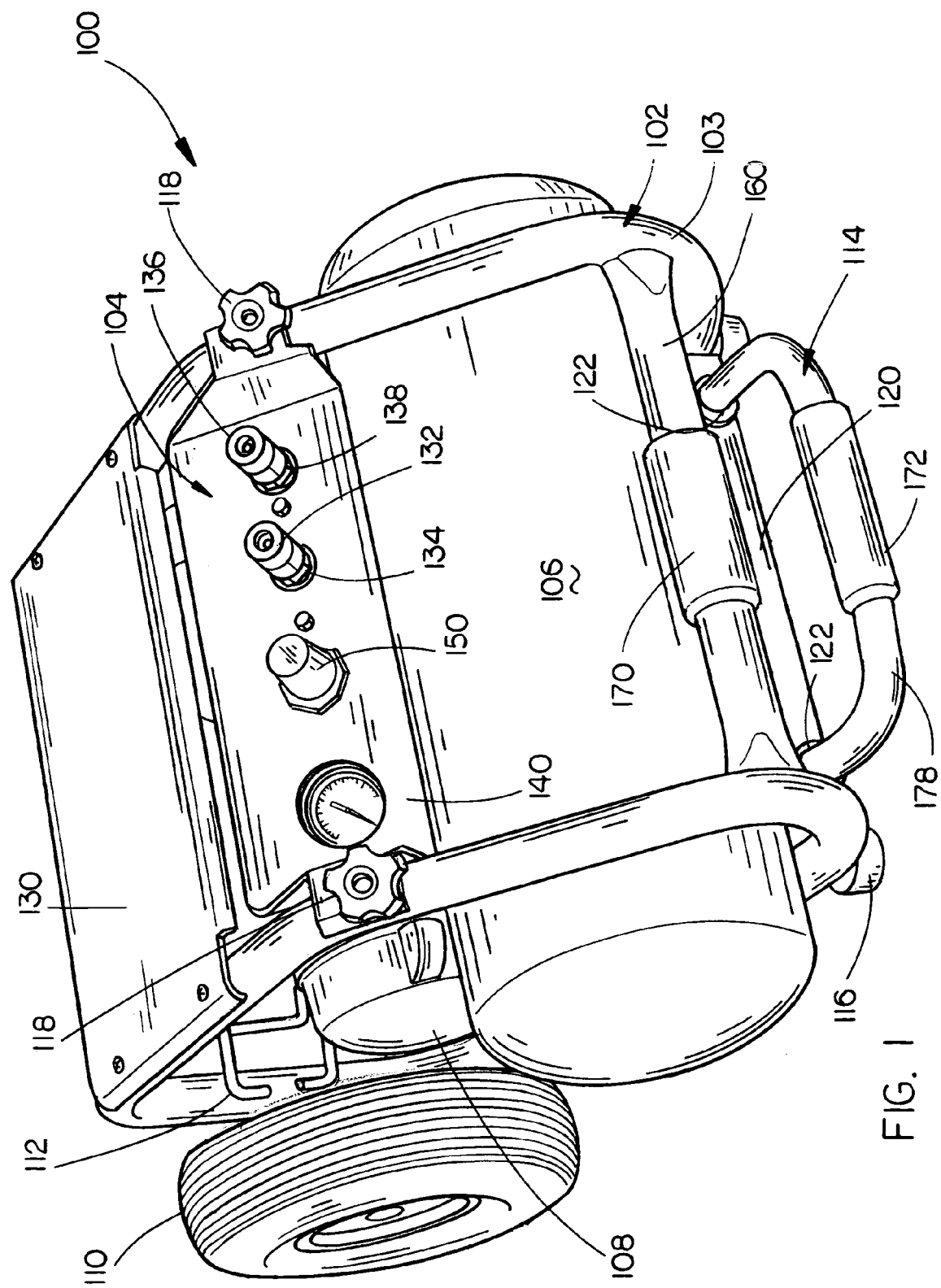
FIG. 1 is an isometric view of an air compressor assembly having an extensible handle bar assembly in accordance with an exemplary embodiment of the present invention.
Figure 6:
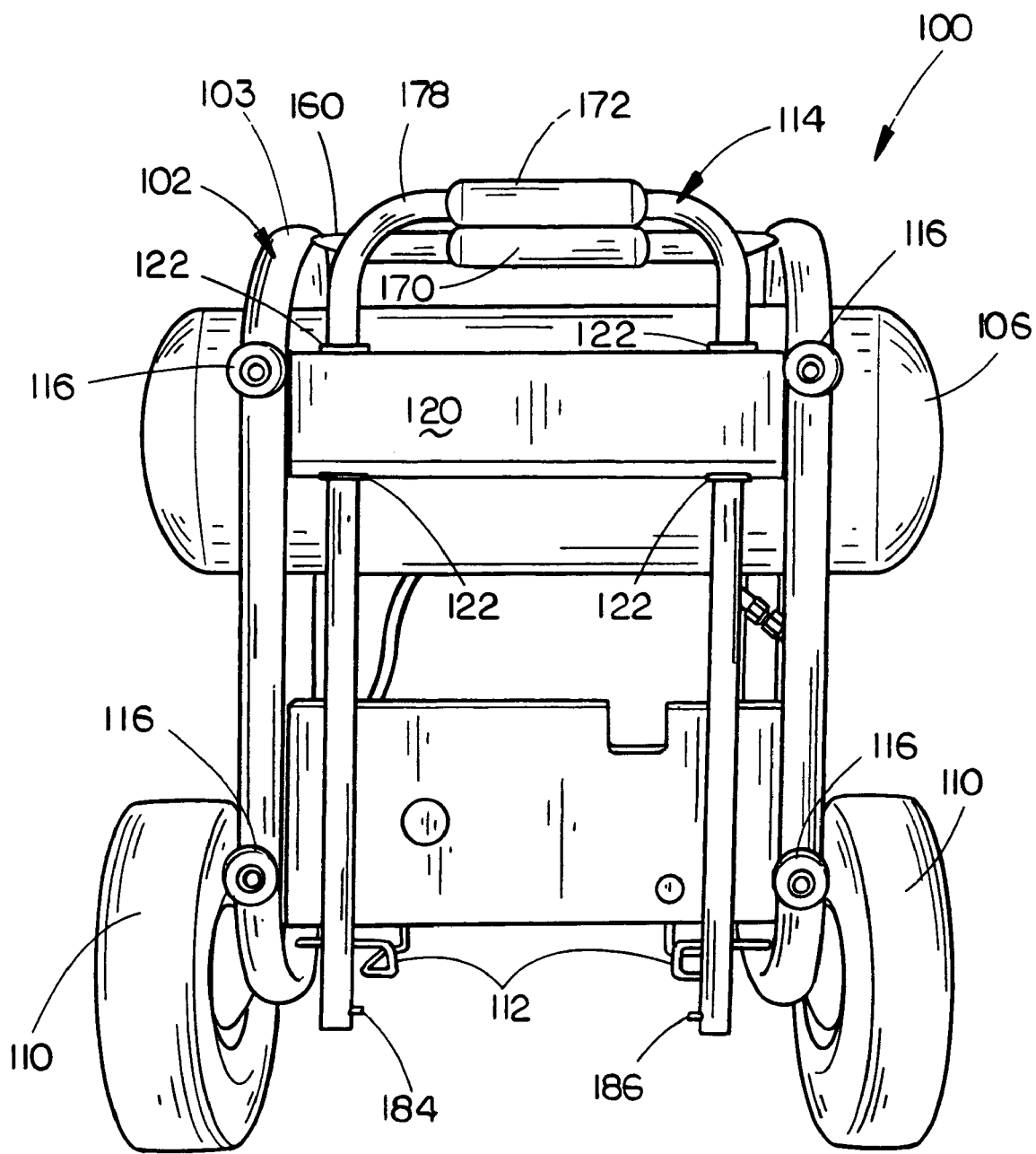
FIG. 6 is a bottom view of the air compressor assembly shown in FIG. 1, wherein another exemplary embodiment of the extensible handle bar assembly is shown.

Referring generally to FIGS. 1 and 6, an air compressor assembly 100 having an extensible handle bar assembly 114 in accordance with exemplary embodiments of the present invention is shown. The air compressor assembly 100 includes an air storage tank 106 for storing compressed air, an air compressor 108 for supplying compressed air to the air storage tank 106, and a removable manifold assembly 104 for controlling and distributing compressed air from the air compressor assembly 100 to one or more air powered tools.

The air compressor assembly 100 is equipped with a roll cage assembly 102 which includes a roll cage 103 that substantially encloses the air storage tank 106 and the air compressor 108 to protect these components from damage due to contact with foreign objects. The air storage tank 106 may be mounted (e.g., welded, or the like) to the roll cage 103.

The roll cage assembly 102 may include a support member 120 mounted to the roll cage 103. In one embodiment, the support member 120 is welded to the roll cage 103. Alternatively, the support member 120 is mounted to the roll cage 102 through fasteners such as screws, bolts, and the like. The support member 120 may have passages 122 defined therein. In one embodiment, the support member 120 is placed beneath the air storage tank 106 to help support the weight of the air storage tank 106. Alternatively, the support member 120 is placed beneath the air compressor 108 to help support the weight of the air compressor 108.

A cover member 130 may be placed on the top of the roll cage 103 to protect the air compressor 108 from contact with foreign objects. A lifting handle assembly 160 may be mounted to the roll cage 103 for lifting the air compressor assembly 100. For example, the lifting handle assembly 160 may be welded to the roll cage 102. The lifting handle assembly 160 may include a grip 170 for easy grasping.

The air compressor assembly 100 may have a wheel assembly 110 mounted to the roll cage assembly 102 so that the air compressor assembly 100 may be transported on wheels. Cushion members 116 may be mounted to the roll cage 103 to support, along with the wheel assembly 110, the weight of the air compressor assembly 100 when the air compressor assembly 100 rests, for example, on the ground (see, FIGS. 2 and 3). A cord drop assembly 112 may be mounted to the roll cage 103.

Figure 4:
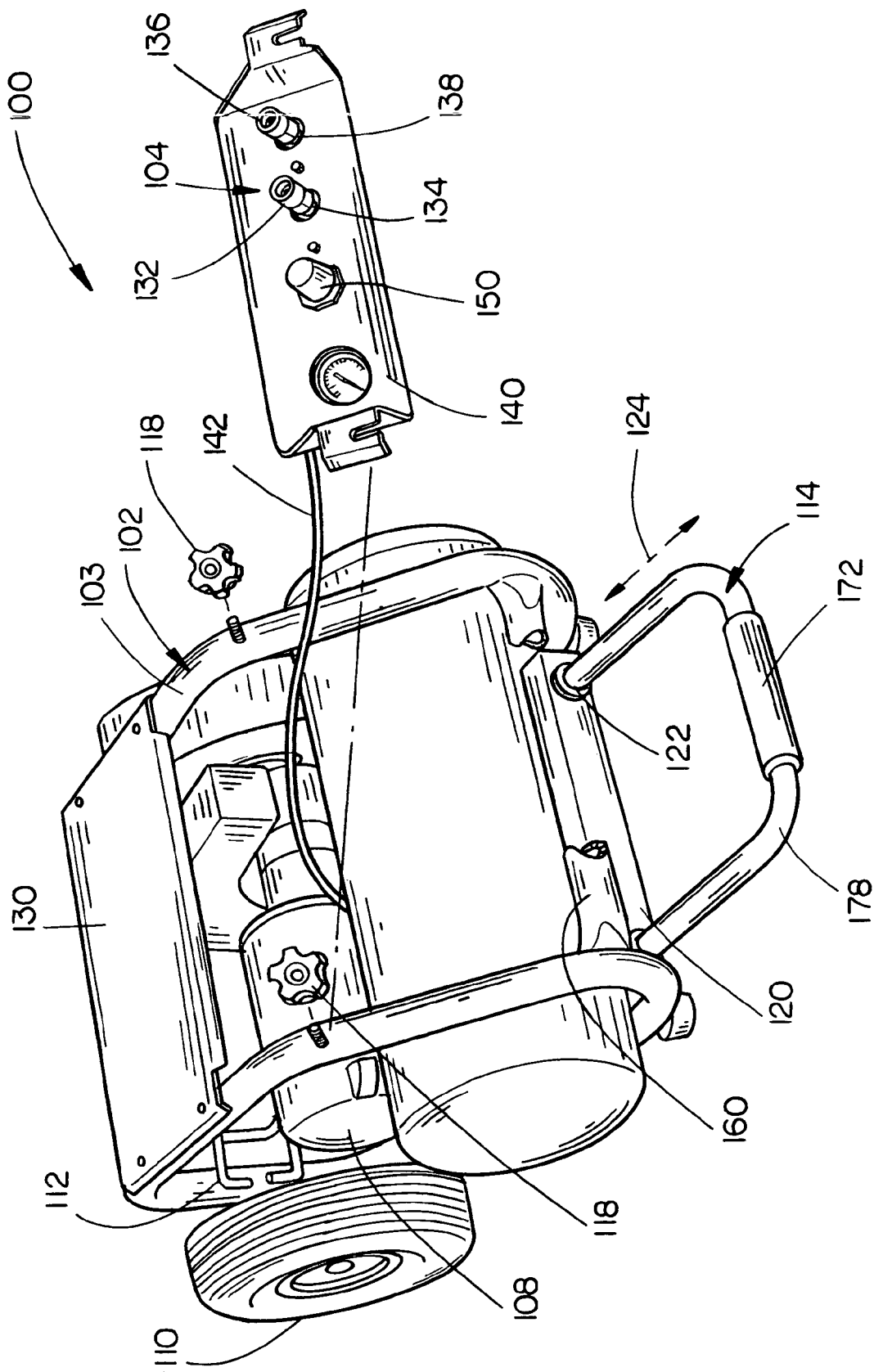
FIG. 4 is an isometric view of the air compressor assembly shown in FIG. 1, wherein a manifold assembly is removed from a roll cage of the air compressor assembly and the extensible handle bar assembly is partially extended.

As shown in FIGS. 1 and 4, the manifold assembly 104 may include a pneumatic manifold (not shown) and at least one pressure regulator assembly 150, coupled to a supporting frame 140. Outlet ports 134, 138 within the pneumatic manifold are fitted with suitable couplers or connectors 132, 136 which extend through apertures in the frame 140 for allowing attachment and removal of air hoses to provide compressed air to one or more air powered tools. In exemplary embodiments of the invention, couplers 132, 136 may be comprised of quick-connect coupler bodies for allowing attachment and removal of air hoses without the use of tools. Alternatively, one or more of the outlet ports 134, 138 may be fitted with a quick-connect coupler plug or stud allowing attachment of air hoses equipped with a quick-connect coupler bodies, a threaded connector (male or female), or the like as contemplated by one of ordinary skill in the art.

As shown in FIG. 1, the manifold assembly 104 may be mounted to the roll cage 103 through fasteners 118 such as screws, bolts, and the like. Alternatively, the manifold assembly 104 may be removed from the roll cage 103 and coupled thereto via a single air hose 142 so the manifold assembly 104 may be utilized at locations remote from the air compressor assembly 100, as shown in FIG. 4.

Figure 5:
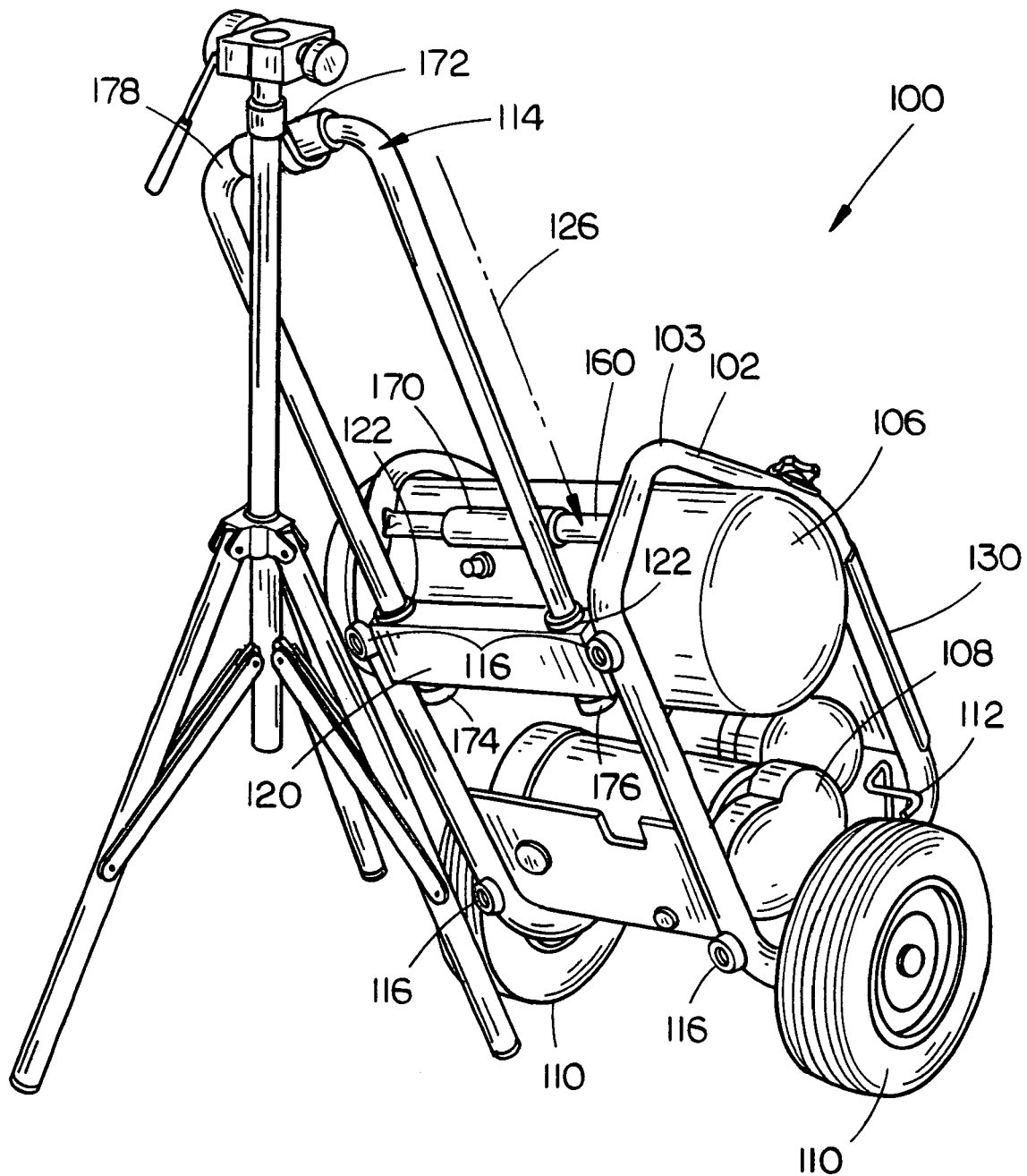
FIG. 5 is an isometric view of the air compressor assembly shown in FIG. 1, wherein an exemplary embodiment of the extensible handle bar assembly is fully extended.

Referring to FIGS. 5 and 6, exemplary embodiments of the extensible handle bar assembly 114 shown in FIGS. 1 through 4 in accordance with the present invention are shown. The extensible handle bar assembly 114 may include a substantially U shaped handle bar 178, and a grip 172 attached to the handle bar 178 for easy grasping. The handle bar 178 may be made of metal, plastic, or the like. The extensible handle bar assembly 114 is mounted to the roll cage assembly 102 and is capable of telescopic movement. For example, the extensible handle bar assembly 114 may be mounted to the roll cage assembly 102 by inserting legs of the handle bar 178 into the passages 122 of the support member 120 and is capable of telescopic movement (i.e., the handle bar 178 is movable along longitudinal directions of the passages 122).

The handle bar 178 may have stops at end portions of the legs to prevent the extensible handle bar assembly 114 from being pulled out of the passages 122. Thus, the extensible handle bar assembly 114, when fully extended, may cooperate with the wheel assembly 110 to transport the suitcase style air compressor assembly 100. In an exemplary embodiment, as shown in FIG. 5, after the handle bar 178 is inserted into the passages 122, stops may be mounted to end portions 174, 176 of the handle bar 178 so that the end portions 174, 176 are wider than the passages 122, preventing the extensible handle bar assembly 114 from being pulled out of the passages 122. In an additional exemplary embodiment, as shown in FIG. 6, the extensible handle bar assembly 114 may include pins 184, 186 sticking out from the outer surface of end portions of the legs of the handle bar 178 when the pins 184, 186 are not pressed, preventing the extensible handle bar assembly 114 from being pulled out of the passages 122. The pins 184, 186 may be made of metal, plastic, or the like. When pressed, the pins 184, 186 may be pushed inside the handle bar 178 so that the handle bar 178 may be inserted into the passages 122. It is understood that stops at end portions of the legs may have other embodiments as may be contemplated by one of ordinary skill in the art without departing from the scope and spirit of the present invention.

Figure 2:
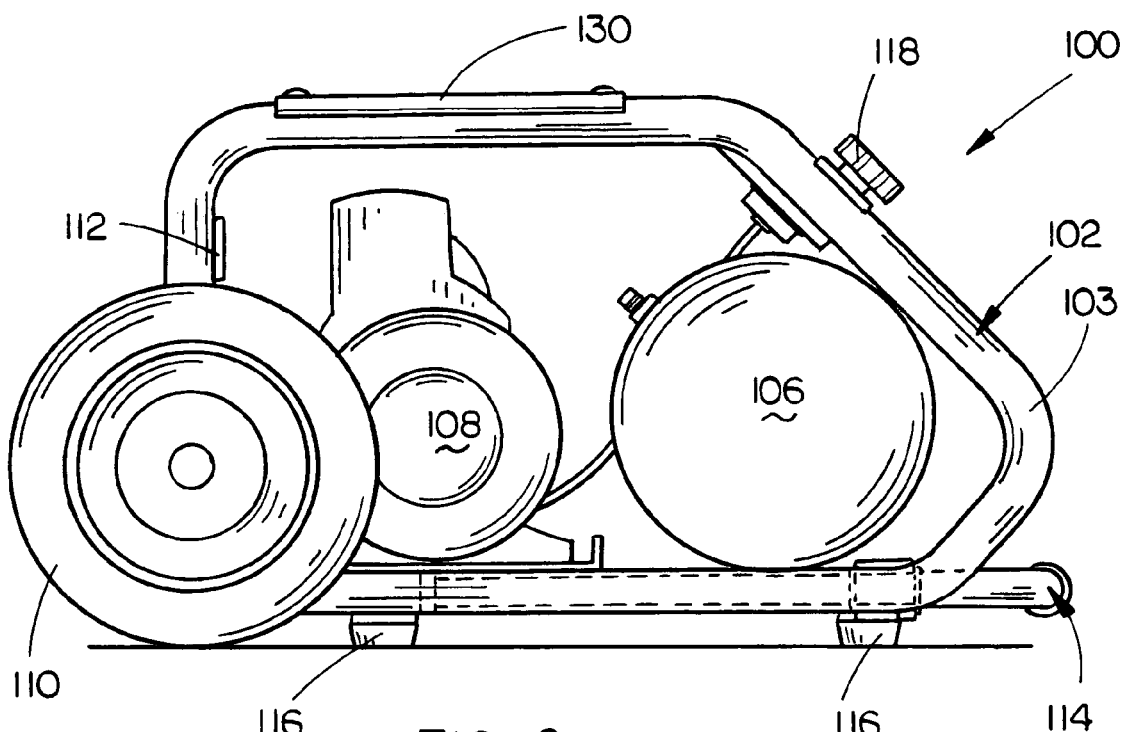
FIG. 2 is a side view of the air compressor assembly shown in FIG. 1.
Figure 3:
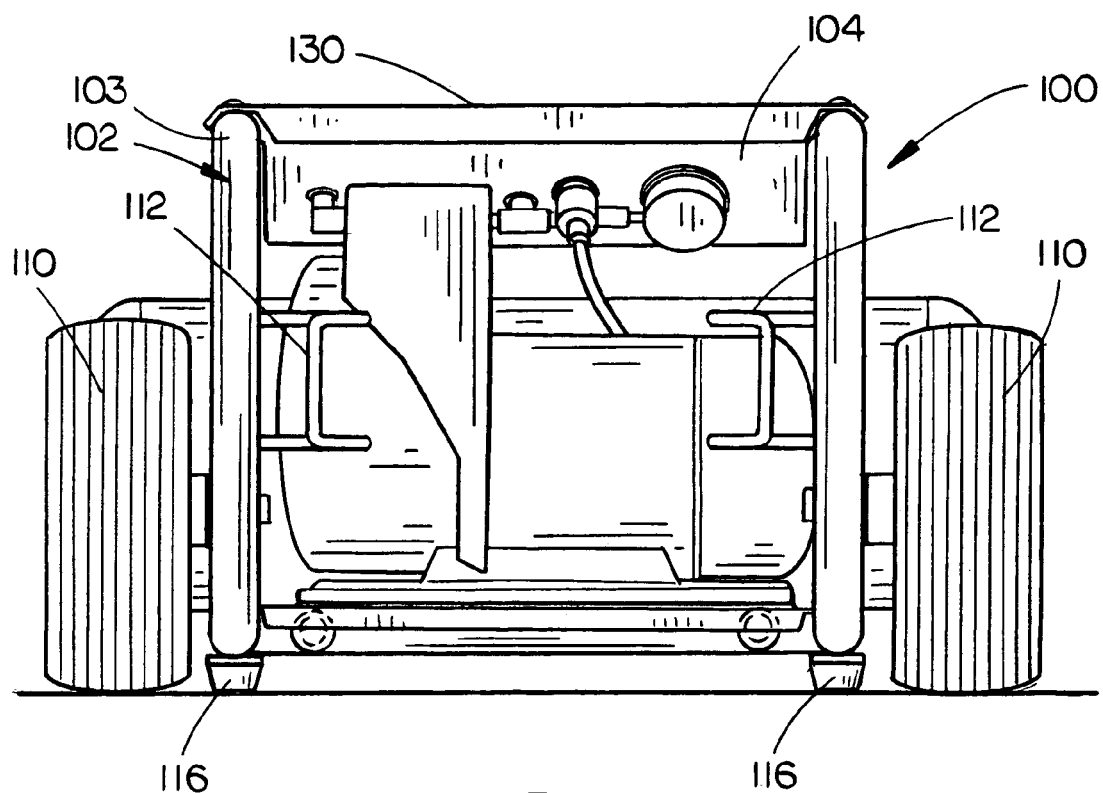
FIG. 3 is an end view of the air compressor assembly shown in FIG. 1.

As shown in FIGS. 4 and 5, the extensible handle bar assembly 114 is capable of telescopic movement. For example, as shown in FIG. 4, the extensible handle bar assembly 114 may be retracted or extended along the line 124. When the extensible handle bar assembly 114 is fully retracted (see, e.g., FIG. 1), the air compressor assembly 100 may occupy a small space, and the air compressor assembly 100 may be lifted by grasping the lifting handle assembly 160 and/or the roll cage assembly 102. When the extensible handle bar assembly 114 is fully extended (see, e.g., FIG. 5), the extensible handle bar assembly 114 may cooperate with the wheel assembly 110 for allowing the air compressor assembly 100 to be easily transported. When the air compressor assembly 100 reaches the destination, the extensible handle bar assembly 114 may be rested against a tripod (see, e.g., FIG. 5), or retracted along the direction 126 to save space with the cushion members 116 resting on the ground as shown in FIG. 2.

Figure 7:
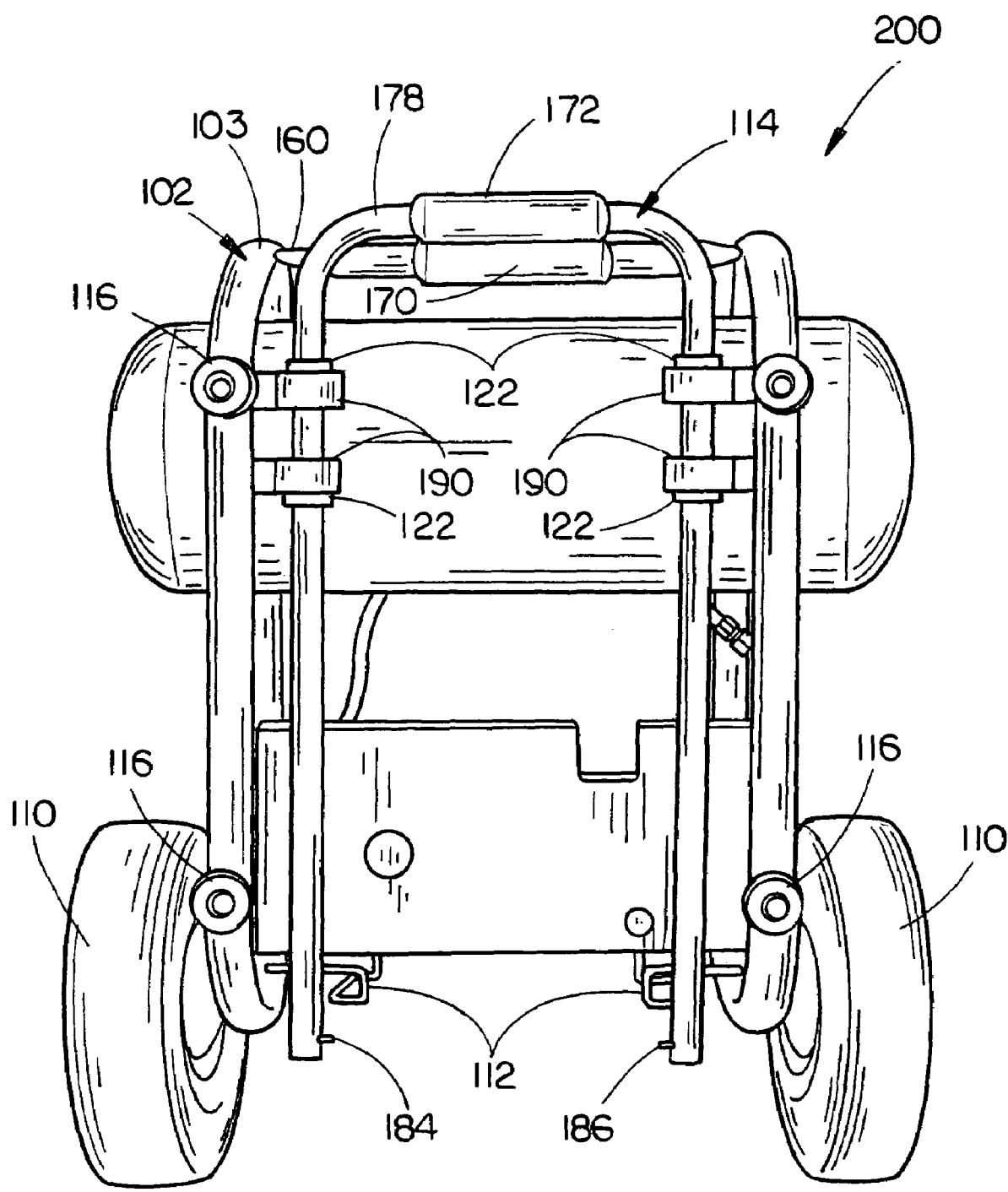
FIG. 7 is a bottom view of an air compressor assembly having an extensible handle bar assembly in accordance with an additional exemplary embodiment of the present invention.

FIG. 7 is a bottom view of an air compressor assembly 200 having an extensible handle bar assembly 114 in accordance with an additional exemplary embodiment of the present invention. The air compressor assembly 200 may have a structure similar to the air compressor assembly 100 as shown in FIGS. 1 through 6. However, the roll cage assembly 102 shown in FIG. 7 does not include the support member 120 as shown in FIGS. 1 through 6. Instead, the roll cage assembly 102 includes brackets 190 mounted to the roll cage 103. The brackets 190 may be made of metal, plastic, or the like. The legs of the handle bar 178 may be inserted into the brackets 190 for telescopic movement (i.e., the handle bar 178 is movable along longitudinal directions of the legs of the handle bar 178).

Figure 8:
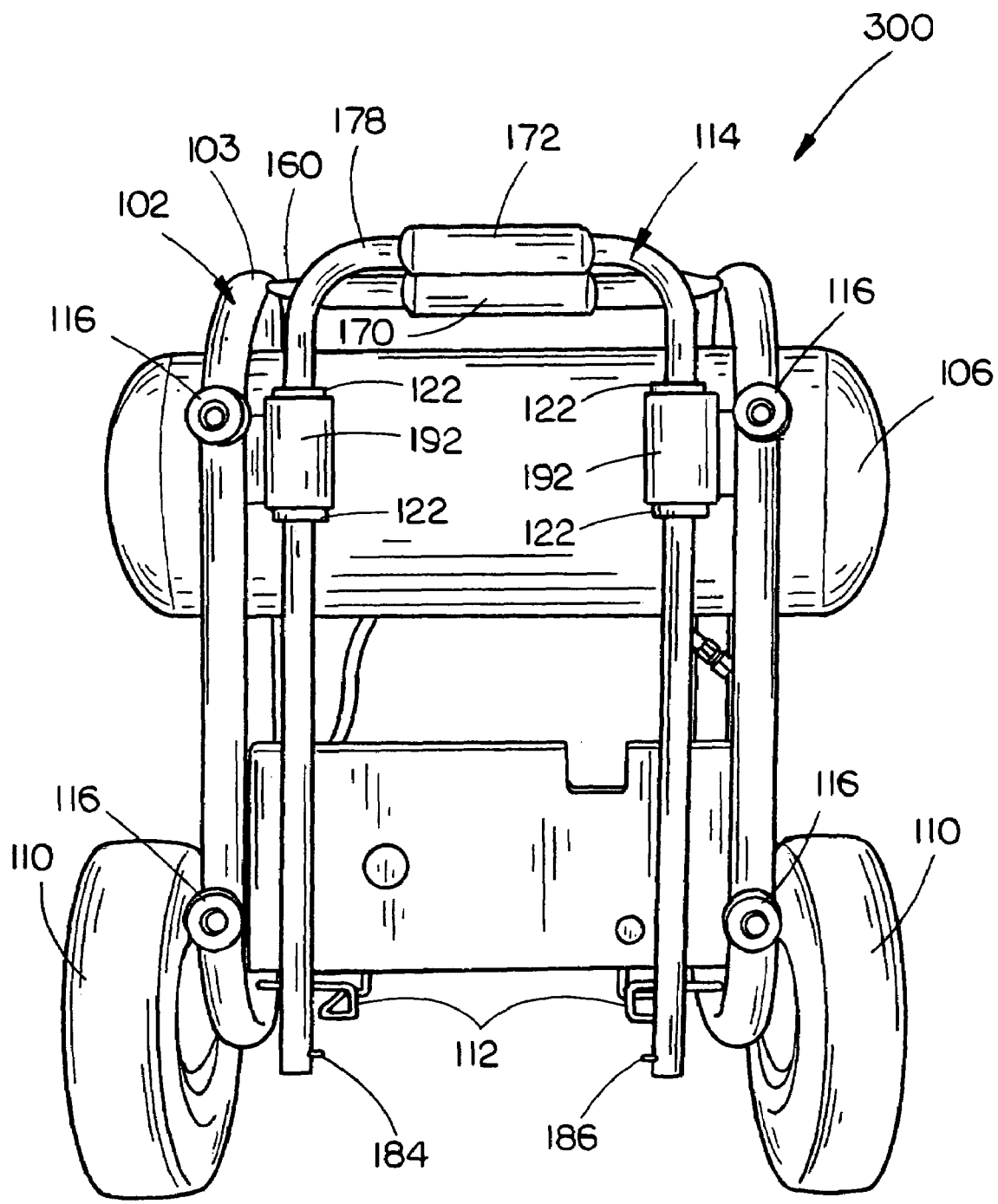
FIG. 8 is a bottom view of an air compressor assembly having an extensible handle bar assembly in accordance with another exemplary embodiment of the present invention.

FIG. 8 is a bottom view of an air compressor assembly having an extensible handle bar assembly in accordance with another exemplary embodiment of the present invention. The air compressor assembly 300 may have a structure similar to the air compressor assembly 100 as shown in FIGS. 1 through 6. However, the roll cage assembly 102 shown in FIG. 8 does not include the support member 120 as shown in FIGS. 1 through 6. Instead, the roll cage assembly 102 includes centrally hollow tubes or cylindrical channels 192 mounted to the roll cage 102. The tubes 192 may be made of metal, plastic, or the like. The legs of the handle bar 178 may be inserted into the pipes 192 for telescopic movement (i.e., the handle bar 178 is movable along longitudinal directions of the tubes 192). It is understood that channels that are not cylindrical may be used instead of the tubes 192 without departing from the scope and spirit of the present invention.

It is understood that the extensible handle bar assembly 114 shown in FIGS. 7 and 8 include stops as may be contemplated by a person of ordinary skill in the art at the handle bar 178 for preventing the handle bar 178 from being fully pulled out of the roll cage assembly 102.

Figure 9:
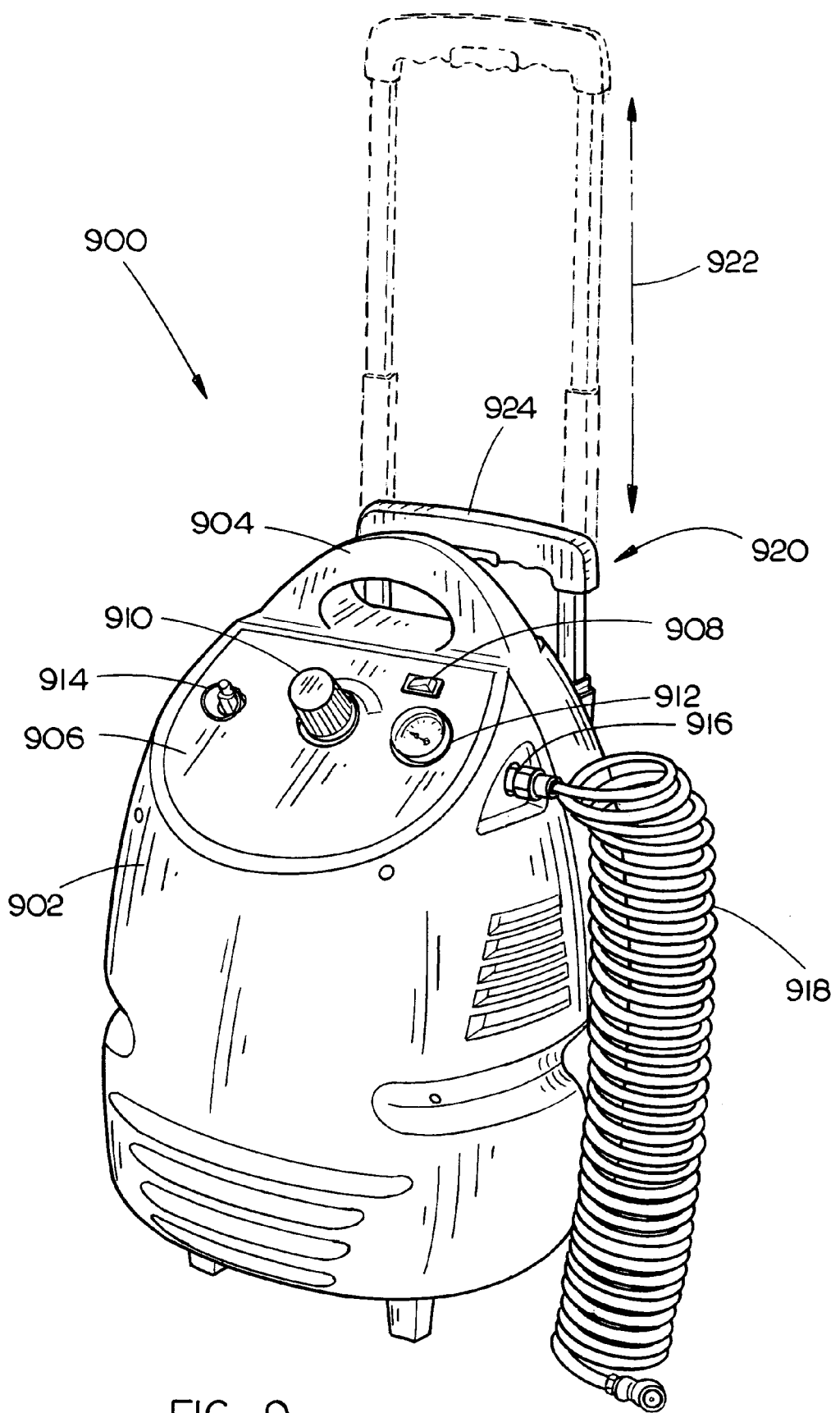
FIG. 9 is an isometric view of an air compressor assembly having an extensible handle bar assembly in accordance with an additional exemplary embodiment of the present invention.
Figure 10:
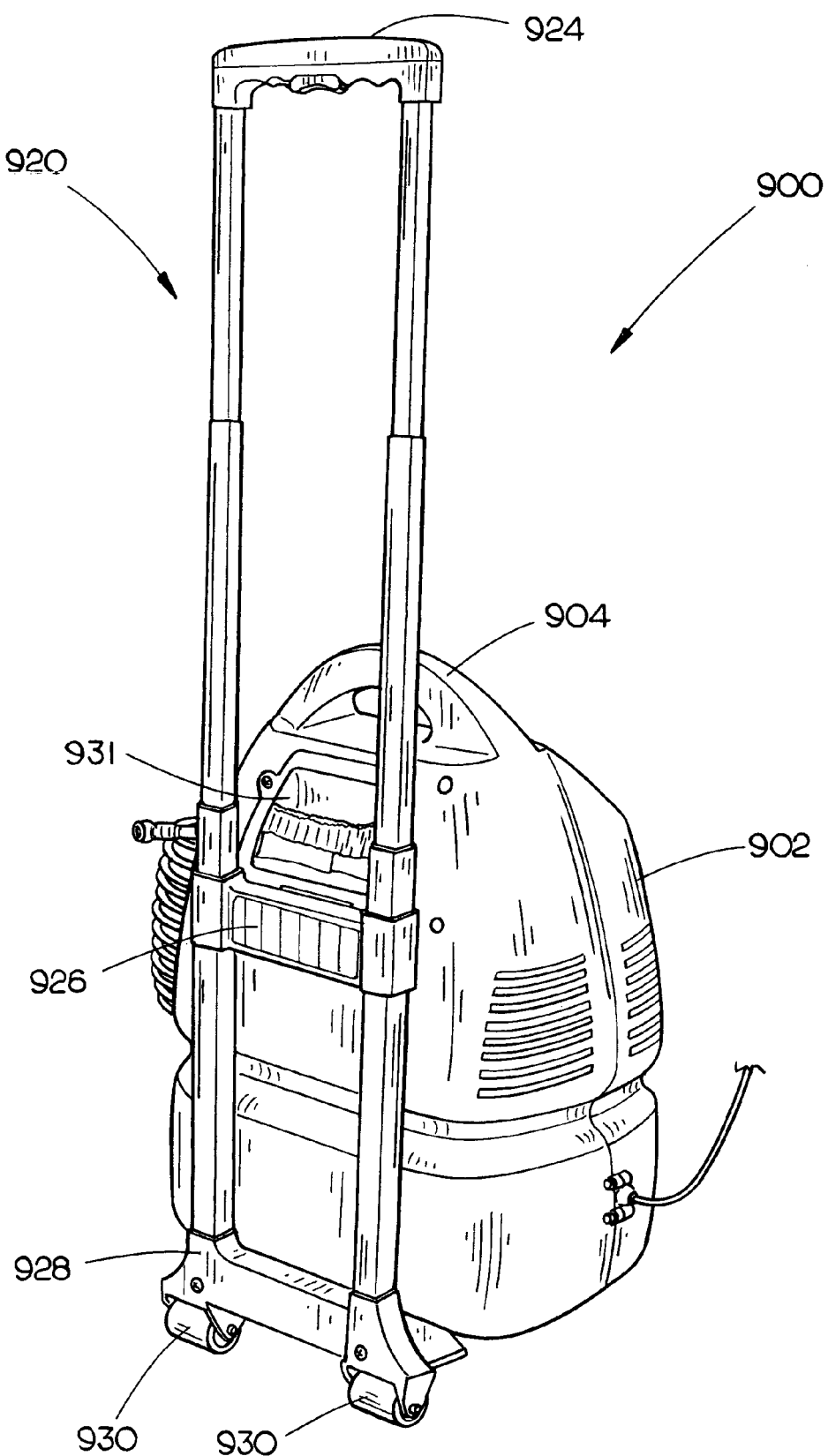
FIG. 10 is another isometric view of the air compressor assembly shown in FIG. 9.
Figure 11:
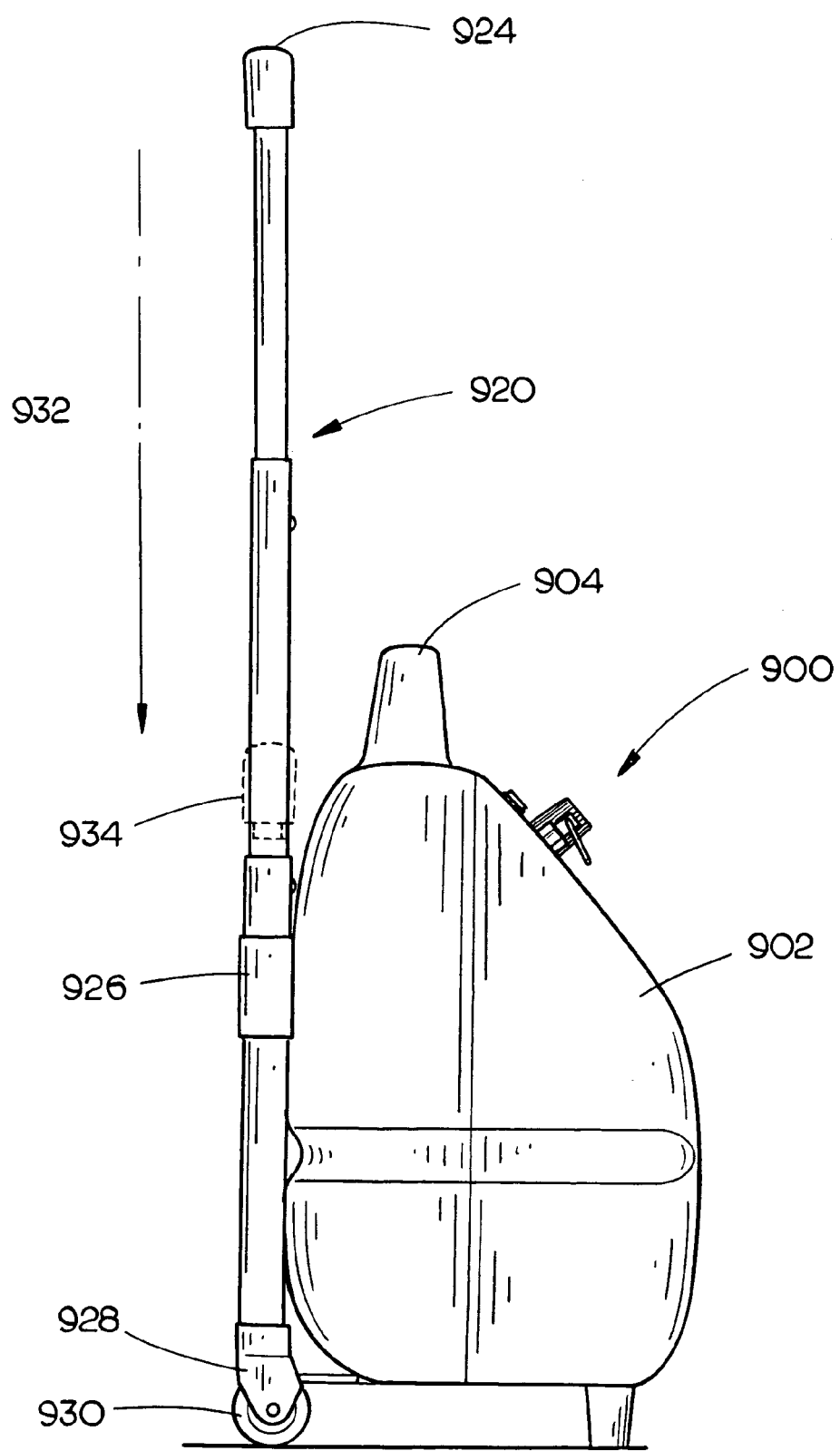
FIG. 11 is a side view of the air compressor assembly shown in FIG. 9.

Referring generally to FIGS. 9 through 11, a portable air compressor assembly 900 having an extensible handle bar assembly 920 in accordance with an additional exemplary embodiment of the present invention is shown. The portable air compressor assembly 900 includes a shroud 902 enclosing an air storage tank (not shown) for storing compressed air, an air compressor (not shown) for supplying compressed air to the air storage tank, and a manifold assembly (not shown) for controlling and distributing compressed air from the air compressor assembly 900 to one or more air powered tools. The shroud 902, which is formed of plastic, metal, or the like, may include a lift handle 904 for allowing an operator to lift the portable air compressor assembly 900, and a control panel 906 for providing controls for the portable air compressor assembly 900. The control panel 906 may include an on/off switch 908, a pressure regulator 910, a pressure gauge 912, and a pressure relief safety valve 914. However, it is understood that the control panel 906 may provide other controls depending on design preferences. Preferably, the shroud 902 may also include a storage compartment 931 (see FIG. 10) for storing air compressor accessories such as fittings, nozzles, and the like, and/or tools such as a wrench, or the like. The air compressor assembly 900 includes an air outlet port 916 connected to an air hose 918, through which the air compressor assembly 900 may supply compressed air to the air tool.

The conventional portable air compressor assembly, although portable, may still be heavy. Further, it may be inconvenient to carry it for a long distance. To solve these problems, the air compressor assembly 900 includes the extensible handle bar assembly 920 for helping an operator to transport the air compressor assembly 900 with ease. The extensible handle bar assembly 920 includes a substantially U shaped handle bar 924 and is capable of telescopic movement along directions 922 (see FIG. 9). The extensible handle bar assembly 920 may be mounted to the shroud 902 via a first support member 926 and a second support member 928. The first support member 926 may be mounted to the middle of the back of the shroud 902, and the second support member 928 may be mounted to a bottom of the back of the shroud 902. The first support member 926 have passages defined therein through which the extensible handle bar assembly 920 is capable of telescopic movement. The first support member 926 and the second support member 928 provide support to the extensible handle bar assembly 920. A wheel assembly 930 is rotatably mounted to the second support member 928. The wheel assembly 930 preferably includes two wheels. However, a single wheel or more than two wheels may be used without departing from the scope and spirit of the present invention.

When the extensible handle bar assembly 920 is fully extended (see FIG. 11), the air compressor assembly 900 may be transported easily by utilizing the extensible handle bar assembly 920 and the wheel assembly 930. When the extensible handle bar assembly 920 is fully retracted (when the handle bar 924 moves along the direction 932 to a point 934, see FIG. 11), the air compressor assembly 900 is more compact and does not require a large space to operate.

Figure 12:
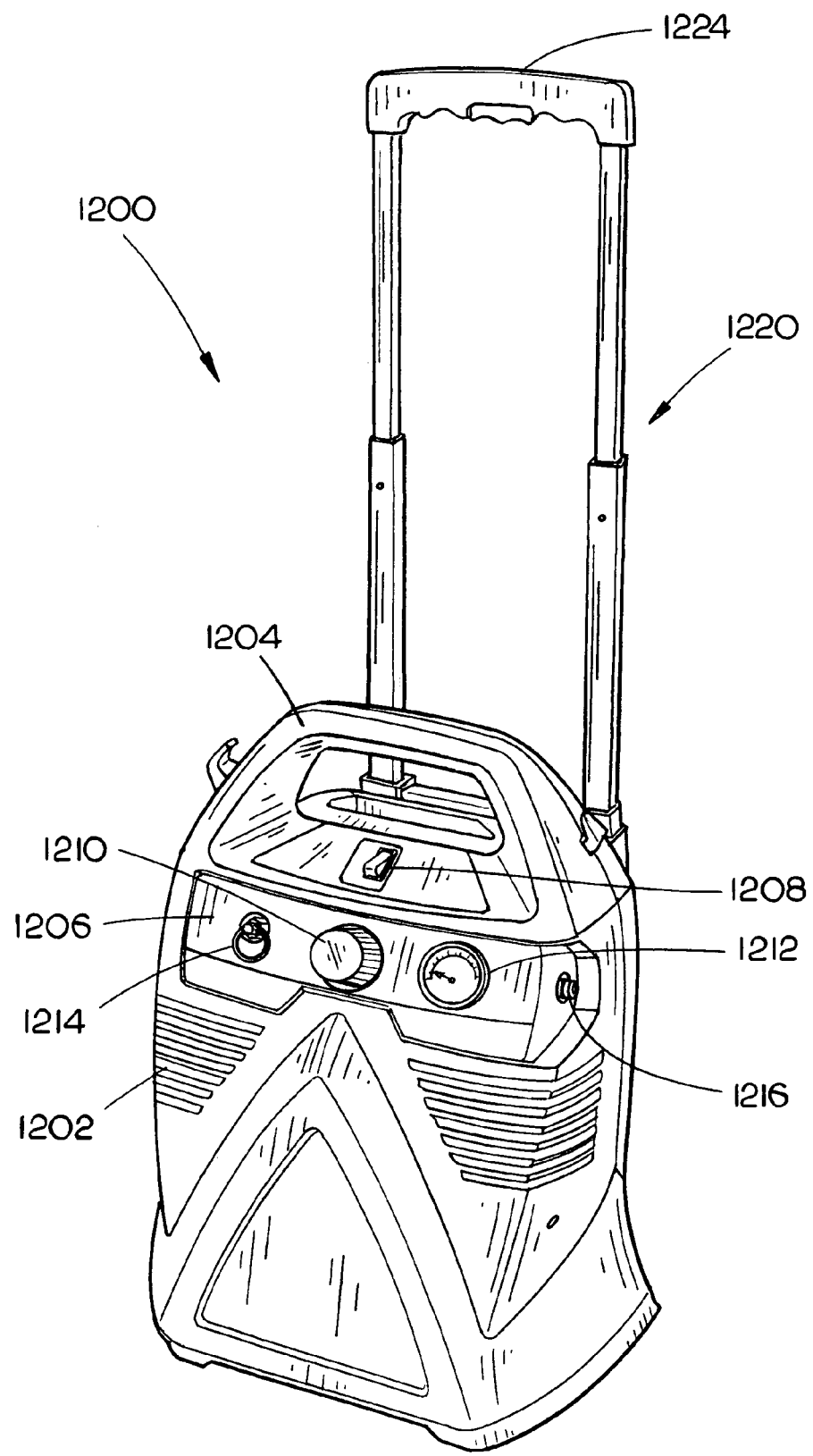
FIG. 12 is an isometric view of an air compressor assembly having an extensible handle bar assembly in accordance with another exemplary embodiment of the present invention.

FIG. 12 shows an air compressor assembly 1200 having an extensible handle bar assembly 1220 in accordance with another exemplary embodiment of the present invention. As shown, the portable air compressor assembly 1200 includes a shroud 1202 enclosing an air storage tank (not shown) for storing compressed air, an air compressor (not shown) for supplying compressed air to the air storage tank, and a manifold assembly (not shown) for controlling and distributing compressed air from the air compressor assembly 1200 to one or more air powered tools. The shroud 1202, which is preferably formed of plastic, may include a lift handle 1204 for allowing an operator to lift the portable air compressor assembly 1200, and a control panel 1206 for providing controls for the portable air compressor assembly 1200. The control panel 1206 may include a pressure regulator 1210, a pressure gauge 1212, and a pressure relief safety valve 1214. However, it is understood that the control panel 1206 may provide other controls depending on design preferences. The shroud 1202 may include an on/off switch 1208 for turning on/off the air compressor assembly 1200. The air compressor assembly 1200 includes an air outlet port 1216 through which the air compressor assembly 1200 may supply compressed air to the air tool. The air compressor assembly 1200 includes the extensible handle bar assembly 1220 for helping an operator to transport the air compressor assembly 1200 with ease. The extensible handle bar assembly 1220 is mounted to the shroud 1202 directly or through other means as may be contemplated by a person of ordinary skill in the art. The extensible handle bar assembly 1220 includes a substantially U shaped handle bar 1224 and is capable of telescopic movement. When the extensible handle bar assembly 1220 is fully extended (see FIG. 12), the air compressor assembly 1200 may be transported easily by utilizing the extensible handle bar assembly 1220 and a wheel assembly (not shown) mounted to the shroud 1202. When the extensible handle bar assembly 1220 is fully retracted (not shown), the air compressor assembly 1200 is more compact and does not require a large space to operate.

Figure 13:
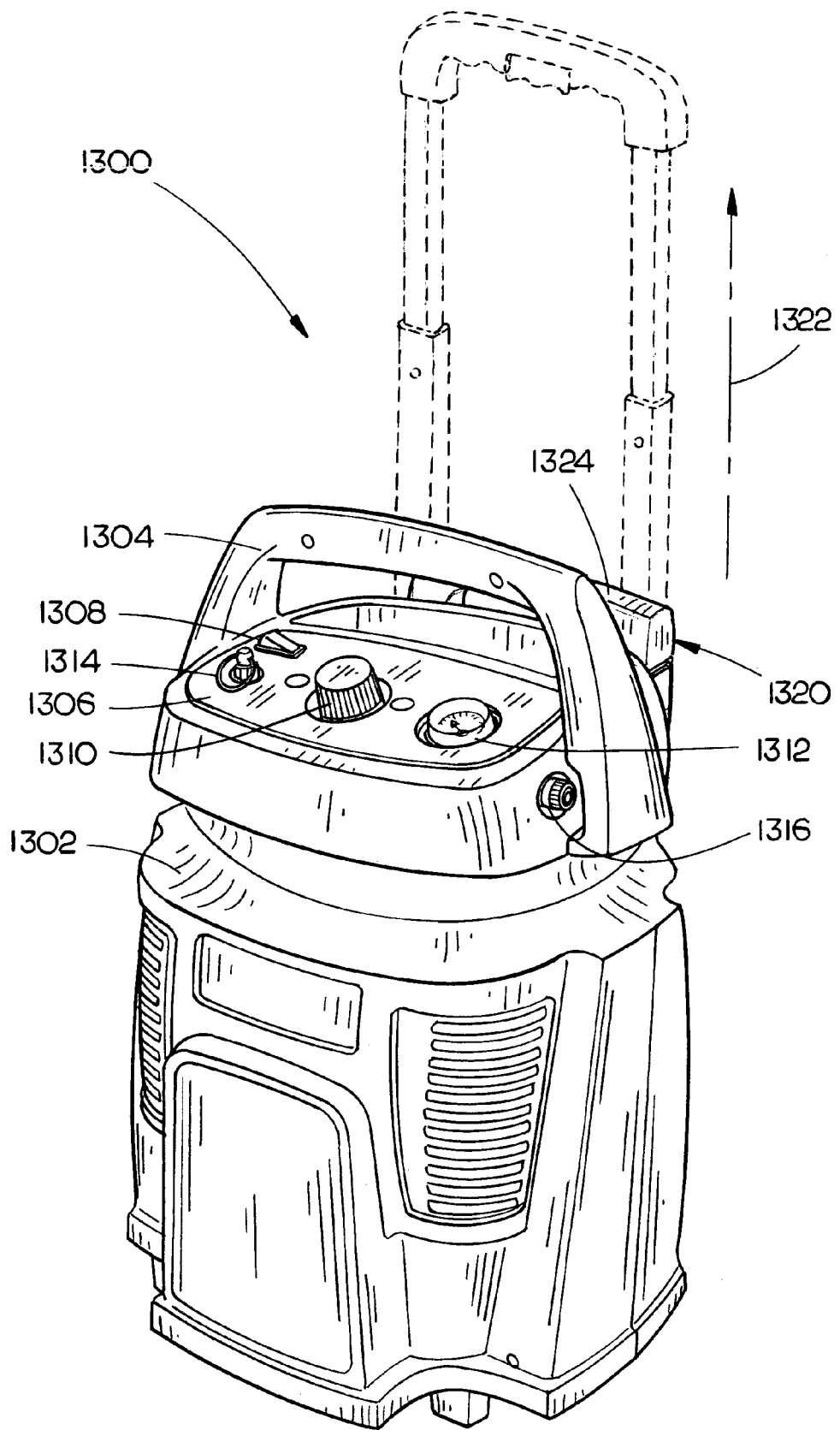
FIG. 13 is an isometric view of an air compressor assembly having an extensible handle bar assembly in accordance with a further exemplary embodiment of the present invention.

FIG. 13 shows an air compressor assembly 1300 having an extensible handle bar assembly 1320 in accordance with another exemplary embodiment of the present invention. As shown, the portable air compressor assembly 1300 includes a shroud 1302 enclosing an air storage tank (not shown) for storing compressed air, an air compressor (not shown) for supplying compressed air to the air storage tank, and a manifold assembly (not shown) for controlling and distributing compressed air from the air compressor assembly 1300 to one or more air powered tools. The shroud 1302, which is preferably formed of plastic, may include a lift handle 1304 for allowing an operator to lift the portable air compressor assembly 1300, and a control panel 1306 for providing controls for the portable air compressor assembly 1300. The control panel 1306 may include an on/off switch 1308, a pressure regulator 1310, a pressure gauge 1312, and a pressure relief safety valve 1314. However, it is understood that the control panel 1306 may provide other controls depending on design preferences. The air compressor assembly 1300 includes an air outlet port 1316 through which the air compressor assembly 1300 may supply compressed air to the air tool. The air compressor assembly 1300 includes the extensible handle bar assembly 1320 for helping an operator to transport the air compressor assembly 1300 with ease. The extensible handle bar assembly 1320 is mounted to the shroud 1302 directly or through other means as may be contemplated by a person of ordinary skill in the art. The extensible handle bar assembly 1320 includes a substantially U shaped handle bar 1324 and is capable of telescopic movement. When the extensible handle bar assembly 1320 is fully retracted (see FIG. 13), the air compressor assembly 1300 is more compact and does not require a large space to operate. When the extensible handle bar assembly 1320 is fully extended along a direction 1322, the air compressor assembly 1300 may be transported easily by utilizing the extensible handle bar assembly 1320 and a wheel assembly (not shown) mounted to the shroud 1302.

It is appreciated although a substantially U shaped handle bar is shown in FIGS. 1 through 13, a handle bar in any other shape may be used instead without departing from the scope and spirit of the present invention. For example, in an alternative embodiment, a substantially L shaped or T shaped single-legged handle bar may be used instead of the substantially U shaped double-legged handle bar.

The suitcase style air compressor assembly in accordance with the present invention may have the following advantages. First, when the extensible handle bar assembly is fully extended, the air compressor assembly may be easily transported by utilizing the extensible handle bar assembly and the wheel assembly. Moreover, the air compressor may also be lifted by grasping the lifting handle assembly and/or the roll cage assembly. Furthermore, after reaching the worksite, the extensible handle bar assembly may be fully retracted so that the air compressor assembly does not require a large space to operate. Additionally, the present telescoping handle feature provides protection for the handle at the worksite or while in storage. Non-telescoping handles can not be moved out of the way once the air compressor is at the jobsite and are susceptible to damage from falling or passing objects. However, the present telescoping handles may be collapsed out of the way and may not be susceptible to damage.

It is believed that the suitcase style air compressor assembly of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An air compressor assembly, comprising:
    an air storage tank for storing compressed air;
    an air compressor for supplying the compressed air to the air storage tank;
    a shroud for enclosing the air storage tank and the air compressor, the shroud including a base portion, a back portion, a front portion, a top portion, and a control panel, the control panel located on at least one of the front portion and top portion;
    a wheel assembly mounted to the shroud;
    an extensible handle bar assembly mounted to the back portion of the shroud, and
    wherein the air compressor assembly when in use rests on the base portion with the top portion located over the base portion and with the extensible handle projectable above the top portion.

2. The air compressor assembly of claim 1 wherein the extensible handle bar assembly includes a handle bar.

3. The air compressor assembly of claim 2 wherein the handle bar is substantially U shaped.

4. The air compressor assembly of claim 2, wherein the handle bar is substantially L shaped or substantially T shaped.

5. The air compressor assembly of claim 1, wherein the extensible handle bar assembly is capable of telescopic movement.

6. The air compressor assembly of claim 1, wherein the shroud includes a lift handle.

7. The air compressor assembly of claim 1, wherein the shroud is formed of plastic or metal.

8. The air compressor assembly of claim 1, wherein the shroud includes a storage compartment for storing air compressor accessories.

\* \* \* \* \*